UNITED STATES PATENT OFFICE.

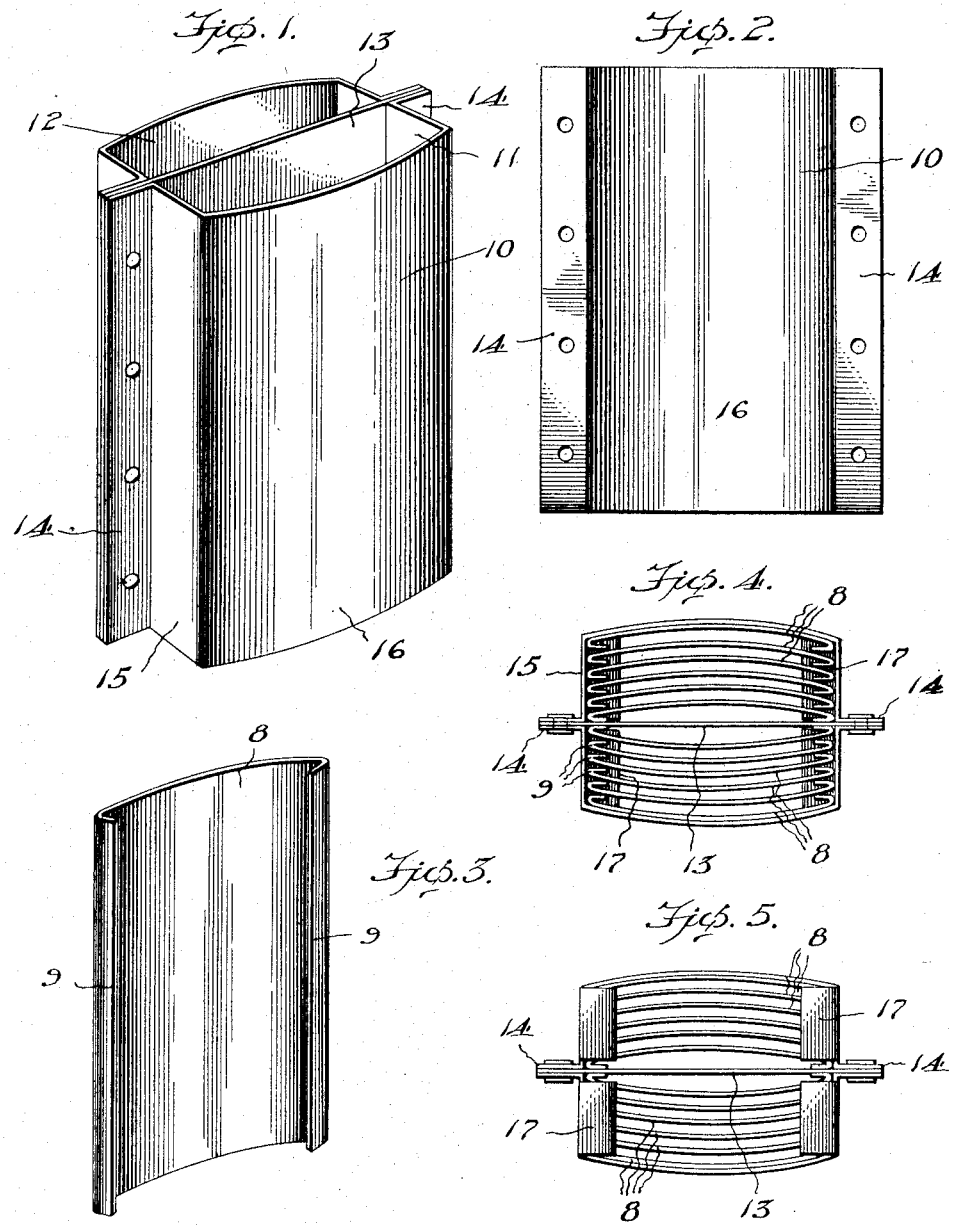

LEWIS L. RANDALL, OF OTTUMWA, IOWA.

PHOTOGRAPHIC DEVELOPING-HOLDER.

1,194,321.              Specification of Letters Patent.      Patented Aug. 8, 1916.

Application filed September 5, 1911. Serial No. 647,712.

*To all whom it may concern:*

Be it known that I, LEWIS L. RANDALL, a citizen of the United States, residing at Ottumwa, in the county of Wapello and State of Iowa, have invented certain new and useful Improvements in Photographic Developing-Holders; and I do hereby declare the following to be a full, clear, and exact description of the invention, such as will enable others skilled in the art to which it appertains to make and use the same.

This invention is a photographic developing holder for plates, films, and certain sensitized papers, having for its object to develop a number of plates, films or prints within a single receptacle, either simultaneously, or separately, and wherein all the negatives or prints may be placed within a holder and deposited in a receptacle containing a developing or fixing fluid, and at the same time permit the withdrawal of any one or more of the negatives or prints from the holder and receptacle, and the replacement of said negative or print within the holder, without liability of injury to said negative or any other negative or print within the holder.

A further purpose of the invention is to mount sensitized material, such as a film, within a suitable carrier or slide, whereby the operator may use said slide in a camera when making an exposure and thereafter remove the slide and its negative to the developing tank.

A further end in view is to provide slides or carriers which will preclude two or more negatives or prints from contacting with each other when in the holder, and at the same time permit the necessary solutions to have free access to the sensitized surface of each negative or print.

With these ends in view, the invention comprises a holder adapted to be removably mounted within any suitable receptacle such as the usual tank, and having means for positioning the same away from the walls of the tank, stop members carried by said holder, and a plurality of negative slides or carriers loosely positioned within the holder, each of said slides being provided with means for spacing the negative side thereof away from its next adjacent slide, or the walls of the holder; said slides engaging, in their operative position, the stop members of said holder, whereby the holder and its plurality of slides may be moved as a unit from the tank, or from place to place.

In the accompanying drawing, I have illustrated one embodiment of the invention, but the construction shown therein is to be understood as illustrative, only, and not as defining the limits of the invention.

Figure 1 is a perspective view of the holder. Fig. 2 is side elevation of the holder. Fig. 3 is a detail perspective view of one of the negative carriers. Fig. 4 is a top plan view of a plurality of negative carriers positioned within the holder. Fig. 5, a bottom plan view of the negative carriers within the holder.

Any suitable receptacle or tank may be employed in connection with the negative holder and carriers shown herein.

An essential feature of the invention resides in the negative carrier or slide 8, shown more particularly in Fig. 3. This slide is constructed of any suitable material, such as metal, and is provided with flanges 9, preferably integral therewith. These flanges 9 are shown positioned on the side edges of the slide, although it is obvious that they can be employed at the ends thereof. In the preferred embodiment of the invention, these slides 8 are concavo-convex in form, as shown in Figs. 3 and 4, with the flanges 9 on the concave side of the slide, although it is obvious that the body of the slides may be straight. The flanges 9 operate to retain a negative or print within the slide, and at the same time serve as means for protecting said negative or print from contact with another slide, as well as convenient means for handling the slide. These concavo-convex negative carriers or slides 8 are intended to hold a sensitized film in a curved position, or a concavo-convex sensitized plate, with the concave sensitized surface toward the object to be photographed. Novel and pleasing results are produced when exposures are made in a camera, on these curved sensitized surfaces, especially when round surfaces are photographed. A number of these slides 8 may be placed directly in a developing tank, for the usual tank development, without liability of injury to the negative or print from contact with other prints or slides, by reason of the flanges 9 serving as a guard. The employment of these slides insures the access of fluid to the sensitized surface, as the flanges preclude the matting together of the negatives or prints.

In order to provide convenient means for handling a plurality of slides, a holder 10 is employed, preferably of the same material as that composing the slides. This holder is shown as composed of a plurality of compartments 11, 12 divided by a suitable transverse wall 13, secured between protruding longitudinal flanges 14 of the end walls 15 of the holder. The side walls 16 of this holder are preferably concavo-convex to conform to the formation of the slides 8. It is obvious, however, that the holder may be constructed with a single compartment, or that it may have a number of compartments. The upper end of this holder 10 is unobstructed, as shown in Fig. 4, thereby permitting the easy removal of the slides from the holder. The lower end of the holder, however, is provided with flanges 17, forming stop members preventing the passage of the slides through this end, but permitting liquid to freely flow through the end and between the various slides carried by the holder. These flanges 17 are shown integral with the end walls 15 of the holder, to facilitate the manufacture of the device. The longitudinal flanges 14 serve as a guide when the holder is inserted into the tank and operate to maintain the holder at a distance from the end walls of the tanks. The flanges further serve as means for handling the holder either when charging the same, or removing a number of slides therefrom, or when inserting the holder into, or taking it out of, the tank.

The holder does not necessarily require that a given number of slides shall be inserted to make it operative, as it is obvious that only one slide may be utilized, or the full capacity of the holder. The operator may be provided with a large number of slides; unexposed films may be placed in some, exposed films in others, undeveloped prints in others, and prints or negatives in the course of development in others.

When an unexposed film is inserted in a slide, and the slide placed within a camera, the operation of the device, after exposure of the film is as follows: The slide or slides are then placed within the holder 10, with the flanges 9 turned toward the center of the holder; the fluid is poured into the compartments at the central portion 12, 13 of the holder. When desired to inspect any particular film during development, it is merely necessary to withdraw the holder by means of the flanges 14, or by the end of the partition 13, whereupon the slide may be readily removed without danger of defacing that film, or any other contained in the holder. The various developing, fixing and washing fluids are changed in the tank (not shown) in the usual manner. The development of prints may be conducted in a similar manner. After development, the films or prints may be allowed to dry in the slides, after which they may be removed and handled in the usual manner.

Having thus fully described my invention, what I claim as new and desire to secure by Letters Patent, is:—

1. In a photographic developing apparatus, a negative holder adapted to be removably positioned in a receptacle, said holder being provided with protruding longitudinal flanges, and a plurality of negative carriers adapted to be positioned endwise within said holder, each of said carriers having means to maintain a space adjacent one face thereof.

2. In a photographic developing apparatus, a holder having protruding longitudinal flanges along the sides thereof and a compartment, a series of negative carriers adapted to be positioned endwise within said compartment, and means on each of said carriers for maintaining a space adjacent one face thereof.

3. In a photographic developing apparatus, a holder having a plurality of compartments, a stop at the base of each compartment, and a series of negative carriers adapted to be positioned endwise within said compartments and to rest upon the stop of the compartment.

4. In a photographic developing apparatus, a holder having a plurality of compartments, each of said compartments being provided with a stop, and a series of negative carriers removably mounted within said holder, and adapted to have one of their ends engage said stop, each of said negative carriers being provided with means for producing a space adjacent to one face thereof.

5. In a photographic developing apparatus, a holder having longitudinal protruding flanges, a division wall within said holder, the ends of said wall being clamped between opposite longitudinal protruding flanges of the holder, thereby forming compartments within said holder, and a series of concavo-convex negative carriers adapted to be positioned endwise within said compartments.

6. In a photographic developing apparatus, a holder provided with protruding longitudinal flanges along the sides thereof, and with convex walls on opposite faces thereof, a division wall through said holder to separate the interior thereof into compartments, and stop members for each of said compartments, and a series of concavo-convex negative carriers adapted to be positioned endwise within said compartments and to engage said stops, said negative carriers being of less length than the said division wall, whereby the holder may be readily grasped at the upper end of the division wall to transfer a plurality of negatives without injury to the material carried by the negative carriers.

7. In a photographic developing apparatus, a negative holder comprising a plurality of plates bent to form side and end walls of a chamber, and a division wall to divide the chamber into a plurality of compartments, each of said plates having a flange extending from a side wall to serve as a stop for negative carriers adapted to be positioned endwise within the compartments.

8. In a photographic developing apparatus, a holder comprising a plurality of outer plates and a division wall secured between said plates to provide compartments in said holder, said outer plates having a flange to serve as a stop plate for each compartment, and a plurality of negative carriers adapted to be positioned in said compartments and to rest upon said stop plate.

9. In a photographic developing apparatus, a holder comprising a plurality of outer plates, each bent to form a concavo-convex side portion, a substantially straight end portion and a guide flange, a division wall adapted to be clamped between a plurality of said guide flanges and serving to provide compartments within the holder, a plurality of negative carriers adapted to be mounted in each of said compartments, each of said carriers having separating flanges along the sides thereof, and means to support said negative carriers within said compartments.

LEWIS L. RANDALL.

Witnesses:
NANCY M. RANDALL,
GEORGE E. EDDY.

Copies of this patent may be obtained for five cents each, by addressing the "Commissioner of Patents, Washington, D. C."